UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

CARBORUNDUM ARTICLES AND PROCESS OF MAKING SAME.

SPECIFICATION forming part of Letters Patent No. 709,808, dated September 23, 1902.

Application filed January 2, 1901. Serial No. 41,893. (No specimens.)

*To all whom it may concern:*

Be it known that I, FRANK J. TONE, of Niagara Falls, Niagara county, New York, have invented a new and useful Improvement in Carborundum Articles and a Process of Making the Same, of which the following is a full, clear, and exact description.

I have discovered that refractory bricks, blocks, and other articles of carborundum having highly-useful properties can be made by molding into the form desired what is known in the manufacture of carborundum as "amorphous carborundum"—namely, an intermediate amorphous condition which the carborundum-making ingredients assume in the electric furnace before their final conversion into crystalline carborundum and which is found in abundance at the end of the run in the outer zone of the furnace. I take such amorphous carborundum, compress it into the form desired for the finished brick or other article, and then place the coherent mass in an electrical furnace and subject it to the high degree of heat required in the manufacture of carborundum. The amorphous carborundum is thus converted into a crystalline mass of carborundum, which is very firm and coherent, but being considerably more porous than if the brick were molded from already-crystallized carborundum it is more desirable for many purposes in the arts—as, for example, in lining furnaces, fire-boxes, &c., for in such uses it will stand sudden changes of temperature without cracking or disintegrating. Other articles in which this porous structure is of advantage may be made by molding them from the amorphous carborundum and crystallizing them, as above described.

Where a still more porous article than can be made from amorphous carborundum is required, I may mold it from a mixture of carbon and silica in proper proportions to form carbid and then subject it to the heat of the electric furnace in order to convert it into carborundum, which by reason of the original compression of the mixture will be more dense and coherent than carborundum crystals as they exist in the ordinary carborundum-furnace, but will be more porous and of less weight per volume than where the article is made of compressed amorphous carborundum.

Where a degree of porosity between that of an article made of compressed amorphous carborundum and an article made of compressed carborundum charge mixture is desired, it can be obtained by compounding the article of amorphous carborundum and charge mixture mixed together.

I may make articles of carbid of boron in the same way by molding them from the amorphous material found in the manufacture of such carbid or by molding them of a mixture of carbon and boracic acid.

The heating of the articles may conveniently be accomplished by embedding them in the charge mixture of an ordinary carborundum-furnace, or they may be treated in a furnace specially constructed for such purpose.

Before molding and compressing the amorphous carborundum or carborundum-forming ingredients I may add to them a solution of silicate of soda or glue or like material, which will act as a temporary bond to hold the article well together before it is heated and crystallized and which will be volatilized and dissipated at the high temperature of the furnace, or such bond may be omitted altogether and the original cohesion of the mass obtained only by compressing.

It sometimes happens that the so-called "amorphous carborundum" is lacking in carbon in sufficient proportion to constitute crystalline carborundum. Such fact in any given case will be recognized by the skilled manufacturer of carborundum, and sufficient carbon should then be added to make up the deficiency.

My invention is of advantage, because it enables me to make carborundum articles very cheaply, amorphous carborundum having heretofore been of little value, and the articles made therefrom, because of their greater lightness and porosity, are for many purposes more useful than articles made from recrystallized carborundum.

Where for any reason carbon is desired to be incorporated in the article, I may add such carbon to the article before it is molded, and where it is present in amount in excess of that required for the formation of the carbid it will remain in the article.

I claim—

1. The method herein described which consists in compressing into coherent form a mass containing non-crystalline material adapted under heat to form crystalline carbid, and then crystallizing it by subjecting it to intense heat; substantially as described.

2. The method herein described which consists in compressing into coherent form a body of amorphous carbid and then crystallizing it by subjecting it to intense heat; substantially as described.

3. As a new article of manufacture, a coherent crystallized body containing non-crystalline carbid having a porous structure and formed by crystallization of a compressed mass of carbid-forming material; substantially as described.

4. The method herein described which consists in compressing into coherent form a mixture composed partly of amorphous carbid and partly of the crude materials from which carbid is made, and then crystallizing such body by subjecting it to intense heat; substantially as described.

In testimony whereof I have hereunto set my hand.

FRANK J. TONE.

Witnesses:
H. M. CORWIN,
L. M. REDMAN.

It is hereby certified that in Letters Patent No. 709,808, granted September 23, 1902, upon the application of Frank J. Tone, of Niagara Falls, New York, for an improvement in "Carborundum Articles and Process of Making Same," errors appear in the printed specification requiring correction, as follows: On page 2, in lines 18 and 19, the words "containing non-crystalline" should be stricken out and the word *of* substituted, and in line 21 same page, the word "of" should be stricken out and the words *containing non-crystalline* inserted; and that the said Letters Patent should be read with these corrections therein that the same may conform to the record of the case in the Patent Office.

Signed and sealed this 18th day of November, A. D., 1902.

[SEAL.]

F. I. ALLEN,
*Commissioner of Patents.*